3,787,526
NON-LINEAR POLYESTERS FROM A DICARBOXYLIC ACID, ETHERIFIED DIPHENOL AND AN ALKOXYLATED POLYHYDROXY COMPOUND
Joseph P. Burns, Joseph Feltzin, and Erich Kuehn, Wilmington, Del., assignors to ICI America Inc., Wilmington, Del.
No Drawing. Continuation-in-part of abandoned application Ser. No. 97,393, Dec. 11, 1970. This application Oct. 22, 1971, Ser. No. 191,839
Int. Cl. C08g 39/10
U.S. Cl. 260—860                      18 Claims

ABSTRACT OF THE DISCLOSURE

New polyester compositions which contain residues of polyfunctional polyhydroxy materials as chain branching members thereof, solutions of said polyester compositions in unsaturated monomers and the cured product of said solutions are disclosed. The polyester compositions as a class are characteristically tough and have liquid and tack points within a specific temperature range.

---

This application is a continuation-in-part of application Ser. No. 97,393, filed Dec. 11, 1970, now abandoned.

This invention relates to new polyester compositions which are non-linear in character and to unsaturated monomeric solutions of these polyesters and to cured polyesters. More particularly, this invention relates to non-linear polyesters, the non-linearity of which is contributed by alkylene oxide derivatives of polyhydroxy compounds. The polyesters are extremely tough and resistant to abrasion and have a relatively narrow melting range.

Polyesters heretofore known usually fall into one of two categories: linear polyesters which are characterized by brittleness and lack of toughness during abrasive handling but which are easily dissolved in unsaturated monomers; or non-linear polyesters which are characterized by inherent toughness and abrasion resistance but which are in general fairly insoluble in unsaturated monomeric solutions and have a relatively high melting point compared to the linear polyester resins. A group of resins which have an inherent toughness and resistance to abrasion, which are relatively soluble in unsaturated monomeric solutions, and which have melting points of less than about 110° C. for easy moldability or fuseability, have long been sought. One of the major uses for this type of polyester resin would be in the electrophotographic printing art since their relatively low melting point would make them useful in the preparation of electrophotographic inks. The toughness of this type of resin would make the resin easy to handle and would facilitate the maintenance of a uniform particle size resulting in clear electrophotographic reproductions.

It is therefore an object of this invention to provide non-linear polyester compositions which are abrasion resistant.

It is another object of this invention to provide non-linear polyester resin compositions which have a melting point suitable for use in an electrophotographic process.

It is another object of this invention to provide non-linear polyester resin compositions which are essentially soluble in unsaturated monomeric solutions.

It is another object of this invention to provide solutions of polyester compositions in unsaturated monomers which may be cured to hard thermal set coating resins.

It is another object of this invention to provide polyester compositions useful in the reinforced laminate art.

These and still other objects of this invention will become obvious to those skilled in the art from the following detailed description of the invention.

In general, the non-linear polyester compositions of this invention are comprised of a polyester of a dicarboxylic acid and a polyol blend. The polyol blend contains about 98 mol percent of an etherified diphenol which may be characterized by the following formula:

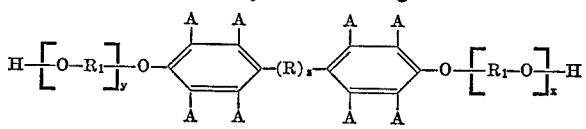

wherein $z$ is 0 or 1; R is an alkylene radical containing from 1 to 5 carbon atoms, oxygen, sulfur, or a divalent radical of the formula:

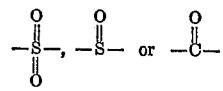

$R_1$ is ethylene or propylene; $x$ and $y$ are integers with the proviso that the sum of $x$ and $y$ in said polyol blend is an average of from about 2.0 to about 7; and each A is individually selected from the group consisting of halogens and hydrogen. An average value for the sum of $x$ and $y$ means that in any polyol blend some of the etherified diphenols within the above formula may have more than 2 or 7 repeating ether units but that the average value for the sum of $x$ and $y$ in any blend is from about 2.0 to about 7. In a preferred embodiment, the average value for the sum of $x$ and $y$ in said polyol blend is from about 2 to about 4, with a more preferred average value for the sum of $x$ and $y$ being from about 2 to about 3. A readily available class of etherified diphenols within the above formula are the etherified bisphenols.

The second component of the polyol blend is an alkoxylated polyhydroxy compound, which polyhydroxy compound contains from 3 to 12 carbon atoms and from 3 to 9 hydroxyl groups. The mols of oxyalkylene groups per mol of polyhydroxy compound is from 1 to about 10 times the number of hydroxyl groups of said polyhydroxy compound. The alkylene oxide used in alkoxylating said polyhydroxy compound is ethylene or propylene oxide. The alkoxylated polyhydroxy compound is present at from 0.01 to 2.0 mol percent of said polyol blend.

The ratio of the number of carboxyl groups of said dicarboxylic acid to the number of hydroxyl groups of said polyol blend of the non-linear polyester resins of this invention may vary from about 1.2 to about 0.8 and preferably from 1.06 to 0.94. In a preferred group of non-linear polyester compositions of this invention, the amount of etherified diphenol characterized by the above formula in the polyol blend may vary from about 99.9 through about 99.0 mol percent of the blend and said alkoxylated polyhydroxy compound from 0.1 to 1.0 mol percent of the polyol blend.

The etherified diphenols used in the preparation of polyester resin compositions of this invention may be prepared by the direct addition of ethylene or propylene oxide to a diphenol or by reacting an olefin halohydrin with a diphenol as disclosed in U.S. Pat. No. 2,331,265. Methods of performing the reactions are well known in the art. It should be noted, however, that where mixtures of alcoholic and phenolic hydroxyl groups are present, the alkylene oxides react preferentially with phenolic hydroxyl groups. Thus, when an excess of alkylene oxide is reacted with a diphenol, both phenolic hydroxyls are etherified prior to any extensive ether chains being formed.

Among those diphenols which are contemplated as the base for the etherified diphenols used in the preparation of the subject polyester resins are:

2,2-bis(4-hydroxyphenyl) propane;
bis(4-hydroxyphenyl) ethane;
3,3-bis(4-hydroxyphenyl) pentane;

p,p'-dihydroxydiphenol;
4,4'-dihydroxydiphenyl ether;
4,4'-dihydroxydiphenyl thioether;
4,4'-dihydroxydiphenyl ketone;
2,2-bis(4-hydroxy; 2,6-dichlorophenyl) propane;
2-fluoro-4-hydroxyphenyl sulfoxide;
4,4'-dihydroxydiphenyl sulfone;
2,3,6 - dichlorobromo - 4 - hydroxyphenyl - 2,6 - dichloro-4-hydroxyphenyl methane; and
2,2-bis(2,3,5,6-tetrabromo-4-hydroxyphenyl)butane.

A preferred group of etherified bisphenols within the class characterized by the above formula are polyoxypropylene 2,2'-bis(4-hydroxyphenyl) propane and polyoxyethylene or polyoxypropylene, 2,2-bis(4-hydroxy, 2,6-dichlorophenyl) propane wherein the number of oxyalkylene units per mol of bisphenol is from 2.1 to 2.5.

The alkoxylated polyhydroxy compounds used in the preparation of the polyester composition of this invention may be prepared by reacting ethylene oxide, propylene oxide, or mixtures thereof with a polyhydroxy compound containing from 3 to 12 carbon atoms and from 3 to 9 hydroxyl groups. A class of such polyhydroxy compounds are monoanhydrides of sugar alcohols, monosaccharides, disaccharides and polyhydroxy alkanes. Among the alkoxylated polyhydroxy compounds included in this class are: polyoxyethylene(10) sorbitol; polyoxyethylene(5) erythritol; polyoxyethylene(4) 1,4-sorbitan; polyoxyethylene (30) pentaerythritol; polyoxypropylene(5) 1,2,3,5,6-hexanepentol; polyoxypropylene(12) sucrose; polyoxyethylene(70) lactitol; and other polyoxyethylene or polyoxypropylene derivatives of hydrogenated polysaccharides, sugars, and anhydrides of polyhydric sugar alcohols. Although the above examples of alkoxylated polyhydroxy compounds utilized only one alkylene oxide in preparing the alkylene oxide derivatives of the polyhydroxy compounds, a mixture of alkylene oxides can also be used. Mixtures of the alkoxylated polyhydroxy compounds may be used in preparing the polyester compositions of this invention. A preferred class of alkoxylated polyhydroxy compounds are those which contain from 1 to 1.5 mols of alkylene oxide per hydroxyl group of the polyhydroxy compound.

In general, the dicarboxylic acid used in preparing the polyester resins of this application may be saturated or unsaturated and may contain substituents such as halogen or sulfur. Among these dicarboxylic acids are the following: phthalic acid, fumaric acid, maleic acid, succinic acid, isophthalic acid, cyclohexane dicarboxylic acid, malonic acid, glutaric acid, and the anhydrides of these acids. A preferred group of acids include fumaric, maleic, and their anhydrides. Mixtures of dicarboxylic acids can also be used.

In general, the polyesters of this invention are prepared by the reaction of the polyol blend with the dicarboxylic acid. The reaction may be performed in an inert atmosphere employing moderate temperatures and substantially atmospheric pressure during an early stage to minimize the loss of dicarboxylic acid by volatilization. As the reaction proceeds, the temperature is increased and the pressure reduced. Esterification catalyst may be used although it is generally preferred to carry out the reaction in the absence of excessive amounts of catalyst to avoid contamination of the final polyester product. It is usually desirable to include a small amount of a polymerization inhibitor, such as hydroquinone or pyrogallol, when an unsaturated dicarboxylic acid is used. The reaction temperatures used for preparing the final polyesters of this invention will usually include heating to about 200° for a portion of the reaction. The resultant polyesters have acid numbers less than about 20.

The properties which make these resins a unique class are their toughness and their low melting point range. In general the resins of this invention will have a liquid point less than about 110° C. and a tack point above about 60° C. The most desirable resins of this invention have a tack point and a liquid point within 20° C. of one another, and a preferred group of resins have a liquid point which is between 85 and 100° C.

The tack point and the liquid point for these resins are determined by a hot bench technique using the Kofler Heizbank, Type 7841 hot bench, which is produced by the C. Reichert Optische Werke AG., of Vienna, Austria. This hot bench is a gradiant temperature heat sink i.e., the temperature varies from one end of the bench to the other. The temperature of the bench midpoint is set at 95° C. and the resin properties are determined. In determining the tack and liquid points a 5-gram sample of finely divided resin is sprinkled across the metal surface of the hot bench. The liquid point is that temperature at which the resin sample forms liquid globules. The tack point is that temperature at which the resin adheres to the hot bench and cannot be brushed off with an artist's brush.

The toughness or abrasive resistance of the resins of the subject invention is another characteristic of the class of resin disclosed herein. This toughness is measured by the following technique. About 115 to 120 grams of resin, which pass through a 60 U.S. mesh screen but are retained on an 80 U.S. mesh screen, are placed in a one quart jar mill, Model 00, by U.S. Stoneware, with 1000 grams of burundum grinding cylinders $1\frac{3}{16}$ inch in diameter by $\frac{3}{16}$ inch long. To prevent caking a half gram of a silicate anti-caking agent is added to the jar mill. The jar mill is run for 60 minutes and 100 grams of the resin are removed, separated from the grinding cylinders and placed on a series of preweighed screens consisting of 60, 80, 100, 120, 140, and 200 U.S. mesh screens. The screens are placed in a Roto-shaker in descending size order and the percent resin on each screen is determined by weighing after 10 minutes of shaking. The material which passes through the 200 U.S. mesh screen during the shaking is collected on a pan and also weighed. The tougher a resin the less material is collected on this pan; that is, the less material passes through a 200 U.S. mesh screen. The polyester compositions of the subject invention have the characteristic that at most about 30 weight percent is degraded sufficiently by this technique to pass through a 200 U.S. mesh screen, and preferably, the toughness of these polyester compositions are such that only at most 20 weight percent tested in accordance with the above procedure passes through a 200 U.S. mesh screen.

The polyester compositions of this invention are excellent toner resins for use in electrophotographic processes such as xerography and Electrofax. The polyester compositions of this invention which are esters of an ethylenically unsaturated dicarboxylic acid are copolymerizable with ethylenically unsaturated monomers to yield resins useful in the coating, casting, and laminating arts. The polyester compositions of this invention are all readily dissolved in ethylenically unsaturated monomers to form a clear, stable solution. The concentration of said ethylenically unsaturated monomer and said polyester composition may vary from 20 to 80 weight percent of the resulting solution.

Among the numerous copolymerizable ethylenically unsaturated monomers which may be used to dissolve the polyester resins of this invention are styrene, vinyl toluene, chlorostyrene, divinyl benzene, diallyl phthalate, acrylonitrile, methyl methacrylate, vinyl acetate, ethyl acrylate, α-methyl styrene, vinyl pyridine, and 2-ethyl hexylacrylate.

In preparing mixed resins from an ethylenically unsaturated monomer and the polyester compositions of this invention, conventional reaction initiators, of the kind frequently referred to as "free radical catalysts," may be used to promote the reaction between the polyester composition and the copolymerizable ethylenically unsaturated monomer. Typical of such initiators or catalysts are organic peroxy compounds such as methyl ethyl ketone peroxide, benzoyl peroxide, tertiary butyl perbenzoate, cumene hydroperoxide, and succinic peroxide.

Accelerators for the reaction between the unsaturated polyester composition and the monomer may also be used. Exemplary of such accelerators are dimethyl aniline and cobalt naphthenate. In order for those skilled in the art to better understand the concept and practice of this invention the following non-limiting examples of the invention are given:

EXAMPLE 1

1,865 grams of polyoxypropylene(2.2)-2,2-bis(4-hydroxyphenyl) propane and 2.9 grams of polyoxypropylene(6) sorbitol are charged to a 3-liter, 4-necked, round-bottom reaction flask which is fitted with a thermometer, a stainless steel stirrer, a glass inlet tube, and a downward condenser. The flask is supported in a Glas-Col electric heating mantle. Through the glass inlet tube nitrogen gas is allowed to flow sparging the polyol blend and resulting in an inert atmosphere in the reaction vessel. The agitator and heating mantle are then activated and the polyol blend is heated to 50° C. at which time 628 grams of fumaric acid and 1.25 grams of hydroquinone are added to the reaction vessel. The nitrogen gas flow is then regulated at a setting of 2.5 on a Sho-Rate meter of the Brooks Rotometer Company. The reaction mass is heated to a temperature of 210° C. over a period of 5 hours. Water of the esterification reaction is removed as it is formed and the mass is maintained at 210° C. for an additional 6½ hours. The course of the reaction is followed by acid value determinations at hourly intervals. At the end of the reaction, when an acid value of about 20 is achieved, the resin is cooled to room temperature. The resin has an acid value of 18.6, a ball and ring softening point of 104° C., a tack point of 75° C., and a liquid point of 100° C. The ratio of hydroxyl groups and carboxyl groups in the preparation of this resin is 1 to 1.

EXAMPLE 2

According to the procedure of Example 1, 1810.0 grams of polyoxypropylene(2.2)-2,2-bis(4-hydroxyphenyl) propane and 29.70 grams of polyoxypropylene(6) sorbitol are charged to a reaction vessel. To this polyol mixture is then added 664 grams of fumaric acid resulting in an equivalence ratio of 1 hydroxyl group for every 1.06 carboxyl groups. Also added is 1.25 grams of hydroquinone. As in Example 1, the acid and the hydroquinone are added after the reaction mixture of polyols reaches 50° C. The reaction mixture is then heated to 210° C. and held there until the acid number is less than about 30 at which point the resinous mixture is cooled to room temperature. The resulting polyester has an acid value of 23.8 and a ball and ring softening point of 121° C. It has a tack point of 78° C. and a liquid point of 109° C.

EXAMPLE 3

According to the procedure of Example 1, 1,882 grams of polyoxypropylene(2.2) - 2,2 - bis(4-hydroxyphenyl) propane and 1.49 grams of polyoxypropylene(6) sorbitol are added to a reaction vessel. The reaction vessel is heated and sparged with nitrogen. When the reaction mixture reaches 50° C., 616.0 grams of fumaric acid and 1.25 grams of hydroquinone are added. The reaction mixture is allowed to heat to 210° C. at which time the reaction mixture is maintained at 210° C. and the water of reaction is removed. The resin upon completion of the reaction, is cooled to room temperature. This resin has an acid value of 18.1, a ball and ring softening point of 99° C., a tack point of 70° C., and a liquid point of 92° C.

EXAMPLE 4

1,865 grams of polyoxypropylene(2.2)-2,2-bis (4-hydroxyphenyl) propane is charged to a 3-liter, 4-necked, round-bottom flask fitted with a thermometer, a stirrer, a gas inlet tube, and a condenser for removal of water of esterification. The flask is placed in an electric heating mantle and the heating mantle and the agitator are started. When the temperature in the reaction medium reaches 50° C., 628 grams of fumaric acid and 1.25 grams of hydroquinone are added to the reaction mixture. Nitrogen gas flow is started at a setting of 2.5 on a Sho-Rate meter produced by the Brooks Rotometer Company. The heating is continued with stirring until 210° C. is reached after about five hours. The water of reaction is removed as it is formed through the condenser and the temperature is then maintained at 210° C. The course of the reaction is followed by determining the acid value at hourly intervals. When the acid value reaches a value of about 50, 2.9 grams of polyoxypropylene(6) sorbitol is added to the reaction mixture and the reaction is continued until an acid value of less than about 25 is determined. At this point, the resin is cooled to room temperature and is found to be a solid, friable material.

EXAMPLE 5

In accordance with the procedure of Example 1, 985 grams of polyoxyethylene(3) bis(4-hydroxyphenyl) ketone and 44.3 grams of polyoxyethylene(30) pentaerythritol are placed in a 3-liter, round-bottom flask. This mixture is heated and when the reaction temperature reaches 50° C., 348 grams of succinic acid is added. The reaction mixture is then heated to a temperature of 215° C. and the water of reaction is continually removed. The course of the reaction is followed by taking hourly samples in determining the acid value. After an acid value of 30 is reached the heat is removed and the reaction mixture is slowly cooled to room temperature. The resulting polyester is a hard, tough solid.

EXAMPLE 6

According to the procedure of Example 4, 1520 grams of polyoxyethylene(2) bis(4-hydroxyphenyl) thioether is charged to a 4-liter, round-bottom flask. This dihydric bisphenol is then heated and sparged with nitrogen to maintain an inert atmosphere. When the temperature in the reaction vessel reaches 50° C., 665 grams of phthalic anhydride is added to the reaction vessel. The water of esterification is removed during the heat up period and the continuing reaction period. When 205° C. is reached, 21 grams of polyoxyethylene(15) sucrose is added. The reaction is continued at 205° C. with hourly samples taken and the acid value determined. When the acid value reaches less than 25, the reaction mixture is cooled down. The resulting resin is a hard, friable, tough material.

EXAMPLE 7

According to the procedure of Example 1, 2190 grams of polyoxyethylene(2.5) - 2,2 - bis(4-hydroxy-2,6-chlorophenyl) propane and 21 grams of polyoxyethylene(12) xylitol are placed in a 4-litre flask. This mixture is heated and when a temperature of 50° C. is obtained, 465 grams of maleic anhydride and 1.25 grams of hydroquinone are added. The heating is continued until a temperature of 210° C. is achieved at which point the temperature is maintained at 210° C. The water of esterification is removed as it is formed through a condenser. The acid value of the reaction mixture is tested at hourly intervals and when the acid number is less than 30, the reaction mixture is cooled to room temperature. The resultant polyester is a tough solid resin.

EXAMPLE 8

According to the procedure of Example 1, 406.8 grams of polyoxypropylene(2)-2,2-bis(4 - hydroxyphenyl) propane, 31.2 grams of polyoxypropylene(16)-2,2-bis(4-hydroxyphenyl) propane, 31.8 grams of polyoxypropylene(6) sorbitol, 116 grams of fumaric acid and 0.3 gram of hydroquinone are charged to a reaction vessel. The reaction is allowed to proceed at 210° C. until an acid number of less than 20 is determined. At this point the reaction vessel is removed from the heat source and cooled. The final polyester resin is a hard, tough resin having an acid value of 18.4 and a ball in ring softening point of 108° C.

EXAMPLE 9

The polyester resin of Example 1 is dissolved in 50 weight percent styrene to form a solution having a viscosity of about 500 centipoise. Castings of this solution are cured in a conventional manner, using benzoyl peroxide and heat. The castings are cured for 16 hours at 70° C. and one hour at 90° C. to form a rigid copolymeric composition.

EXAMPLE 10

The polyester resin prepared in Example 3 is blended with 65 weight percent of methylmethacrylate. To this polyester monomer solution is then added a benzoyl peroxide catalyst and mats of fiber glass are coated with the resin solution. The fiber glass mats are cured in the conventional manner by applying a low heat source. The laminates are thus cured for 16 hours at 70° C. and for one hour at 90° C. to form a relatively inflexible fiber glass laminate.

EXAMPLE 11

The polyester resin of Example 7, is dissolved in 50 weight percent of vinyl toluene to which is added a benzoyl peroxide catalyst. Castings of this solution are cured at 70° C. for 16 hours and then at 90° C. for an additional hour. Flexible copolymeric compositions are obtained which are tough and abrasive resistant.

EXAMPLE 12

According to the procedure of Example 1, 1913.0 grams of polyoxypropylene(4)-2,2-bis(4 - hydroxyphenyl) propane and 48.6 grams of polyoxypropylene(6) sorbitol are charged to a reaction vessel. To this polyol mixture is then added 538.4 grams of fumaric acid and 1.25 grams of hydroquinone. The equivalence ratio of hydroxyl groups to carboxyl groups is then equal to one. As in Example 1, the acid and hydroquinone are added after the reaction mixture of polyols reaches 50° C. The reaction mixture is then heated to 210° C. and held there until the acid number is less than about 20 at which time the resinous mixture is cooled to room temperature. The resulting polyester is a solid friable material.

EXAMPLE 13

According to the procedure of Example 1, 2005 grams of polyoxypropylene(6)-2,2-bis(4 hydroxylphenyl) propane, 42 grams of polyoxypropylene(6) sorbitol, 453 grams of fumaric acid, and 1.25 grams of hydroquinone are charged to a reaction vessel. As in Example 1, the acid and hydroquinone are added after the reaction mixture of polyols reaches 50° C. The reaction is allowed to proceed at 210° C. until an acid number of less than 15 is achieved. At this point the reaction mass is cooled to room temperature. The final polyester is a tough resin soluble in unsaturated monomers providing solutions which may be cured to hard thermoset resins.

Having thus described the invention, the following is claimed:

1. A non-linear polyester reaction product of a dicarboxylic acid and a polyol blend, said polyol blend comprising:
at least about 98 mol percent of an etherified diphenol characterized by the formula:

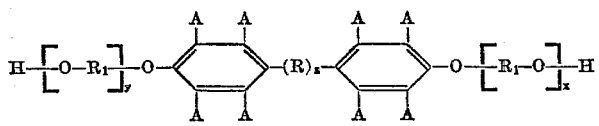

wherein $z$ is 0 or 1; R is an alkylene radical containing from 1 to 5 carbon atoms, a sulfur atom, an oxygen atom, or a radical characterized by the formula:

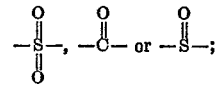

$R_1$ is an ethylene or propylene radical; $x$ and $y$ are integers with the proviso that the sum of $x$ and $y$, in said polyol blend is an average of from about 2.0 to about 7; and each A is individually selected from the group consisting of hydrogen and halogen atoms; and from about 0.01 to about 2.0 mol percent of an alkoxylated polyhydroxy compound, which polyhydroxy compound contains from 3 to 12 carbon atoms and from 3 to 9 hydroxyl groups and wherein the alkoxylated polyhydroxy compound contains from 1 to 10 mols of oxyalkylene groups per hydroxyl group of said polyhydroxy compound and said oxyalkylene radical is ethylene or propylene;
the number of carboxyl groups of said dicarboxylic acid to the number of hydroxyl groups of said polyol blend is in a ratio of from about 1.2 to about 0.8.

2. A non-linear polyester composition according to claim 1 wherein said alkoxylated polyhydroxy compound comprises from about 0.1 to about 1.0 mol percent of said polyol blend.

3. A non-linear polyester composition according to claim 1 wherein the polyhydroxy compound is sorbitol, xylitol, pentaerythritol, glycerol, or erythritol.

4. A non-linear polyester composition according to claim 1 wherein said ratio is from 1.06 to 0.94.

5. A non-linear polyester composition according to claim 1 wherein said etherified diphenol is selected from the group consisting of polyoxypropylene 2,2-bis(4-hydroxyphenyl) propane; polyoxypropylene 2,2-bis(4-hydroxy-2,6-chlorophenyl) propane; and polyoxyethylene 2,2-bis(4-hydroxy-2,6-chlorophenyl) propane; wherein the mols of ethylene oxide or propylene oxide per mol of bisphenol is from 2.1 to 2.5.

6. A non-linear polyester composition according to claim 5 wherein the polyhydroxy compound is sorbitol, xylitol, pentaerythritol, glycerol, or erythritol.

7. A non-linear polyester composition according to claim 1 wherein said polyhydroxy compound is selected from the group consisting of monosaccharides, disaccharides, monoanhydrides of sugar alcohols and polyhydroxy alkanes.

8. A polyester solution which comprises from about 80 to about 20 weight percent of an ethylenically unsaturated monomer and from about 20 to about 80 weight percent of a polyester composition of claim 1.

9. A polyester solution according to claim 8 wherein said ethylenically unsaturated monomer is styrene.

10. A composition of matter which comprises a cured polyester resin-unsaturated monomer solution of claim 8.

11. A composition of matter which comprises a cured polyester resin-styrene solution of claim 9.

12. A composition of claim 1 wherein the sum of $x$ and $y$ in said polyol blend is an average of from about 2 to about 4.

13. A composition of claim 1 wherein the sum of $x$ and $y$ in said polyol blend is an average of from about 2 to about 3.

14. A non-linear polyester composition according to claim 6 wherein the dicarboxylic acid is an unsaturated dicarboxylic acid.

15. A composition of claim 6 wherein the dicarboxylic acid is selected from the group consisting of phthalic acid, fumaric acid, maleic acid, succinic acid, isophthalic acid, cyclohexane dicarboxylic acid, malonic acid, glutaric acid, and the anhydrides of these acids.

16. A polyester composition of claim 14 wherein the dicarboxylic acids are selected from the group consisting of fumaric acid, maleic acid, and their anhydrides.

17. A composition of claim 5 wherein the polyhydroxy compound is sorbitol and the dicarboxylic acid is fumaric acid.

18. A composition of claim 1 wherein the etherified diphenol is polyoxypropylene 2,2-bis(4-hydroxyphenol) propane where the mols of propylene oxide per mol of bisphenol is an average of from about 2 to about 4; the plyhydroxy compound is sorbitol and the dicarboxylic acid is selected from the group consisting of fumaric acid and maleic acid or the anhydrides thereof.

References Cited
UNITED STATES PATENTS

| | | | |
|---|---|---|---|
| 2,331,265 | 10/1943 | Coleman et al. | 260—47 |
| 2,413,814 | 1/1947 | De Groote | 260—47 |
| 2,593,411 | 4/1952 | Caldwell | 260—47 |
| 2,634,251 | 4/1953 | Kass | 260—47 |
| 2,662,069 | 12/1953 | Kass | 260—45.4 |
| 2,662,070 | 12/1953 | Kass | 260—45.4 |
| 2,687,430 | 8/1954 | Snow et al. | 260—75 UA |
| 3,350,331 | 10/1967 | Liebling et al. | 117—161 |

FOREIGN PATENTS

| | | | |
|---|---|---|---|
| 751,116 | 5/1970 | Belgium | 260—45.4 |

WILLIAM H. SHORT, Primary Examiner

E. WOODBERRY, Assistant Examiner

U.S. Cl. X.R.

260—9, 47 C, 47 EQ, 49, 75 R, S, 873